No. 875,383. PATENTED DEC. 31, 1907.
G. E. SCHOFIELD.
OPTICAL TOOL.
APPLICATION FILED MAY 18, 1907.

Witnesses
Oliver W. Holmes
M. E. Kelly

Inventor
G. E. Schofield,
By Beeler & Robb
Attorneys

UNITED STATES PATENT OFFICE.

GEORGE E. SCHOFIELD, OF BALTIMORE, MARYLAND.

OPTICAL TOOL.

No. 875,383.　　　　Specification of Letters Patent.　　　　Patented Dec. 31, 1907.

Application filed May 18, 1907. Serial No. 374,449.

*To all whom it may concern:*

Be it known that I, GEORGE E. SCHOFIELD, a citizen of the United States, residing at Baltimore, in the State of Maryland, have invented certain new and useful Improvements in Optical Tools, of which the following is a specification.

The main object of this invention is to provide a very simple but effective little tool especially adapted to be carried by a traveling optician, and is designed particularly to facilitate the drilling of openings in lenses, and operations upon nose pieces or bridges of spectacles and eye-glasses.

As is well known it is impracticable for traveling opticians to carry with them the ordinary apparatus customarily employed in shops, for optical work, though it is necessary that they shall be provided with some convenient means for drilling and otherwise operating upon eye-glasses, both the lenses and the metal trimmings employed therefor.

The present invention embodies a compound tool, adapted to be made so as to occupy a very small amount of space, three or four inches, or there about, and convenient for performing various operations such as above premised.

Figure 1:
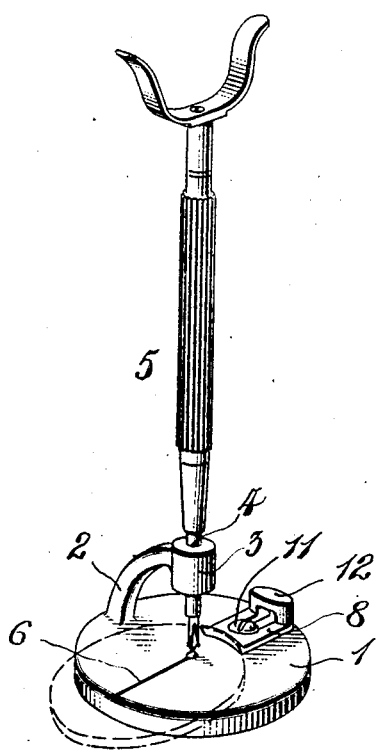
Figure 3:
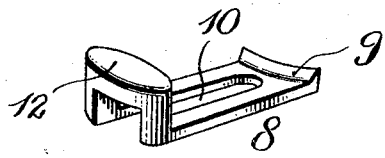
Figure 4:
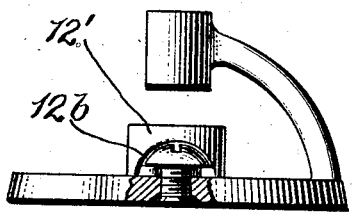
Figure 2:
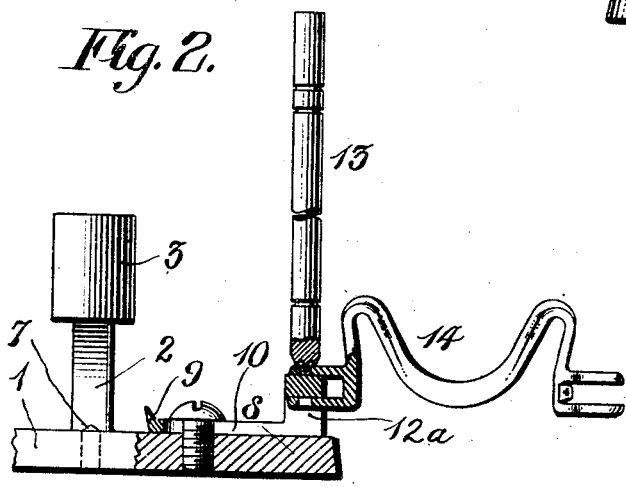

For a full understanding of the invention and the merits thereof and also to acquire a knowledge of the details of construction of the means for effecting the result, reference is to be had to the following description and accompanying drawings, in which:

Figure 1 is a perspective view of an optical tool embodying the present invention; Fig. 2 is a transverse sectional view of the device, the drill being removed, and the nose piece of a pair of eye glasses being diposed in operative position as when being actually operating upon; Fig. 3 is a detail perspective view of the gage plate and anvil, alone, and Fig. 4 shows a slightly modified form of the gage plate and anvil member.

Specifically describing the present invention, and referring to the drawing, the numeral 1 designates a bed plate which is preferably of circular form though it may be of any suitable shape, said plate being provided with an integrally upwardly projecting standard 2 which extends from an edge portion thereof and terminates at its upper end at a point above the center of the plate 1, being provided at such upper end with a vertically apertured head 3. The aperture 4 of the head 3 comprises a vertical bearing in which is journaled a small hand drill 5, the latter being of conventional type, as shown most clearly in Fig. 1 of the drawing. In its upper surface the bed plate 1 is provided with a suitable gage-mark 6 indented therein, the latter being employed to facilitate a proper positioning of a lens which may be disposed upon the plate 1 preparatory to drilling an opening or openings therein. A small projection 7, or point, extends upwardly from the plate 1 and is adapted to coöperate with a lens to adjust the position of the latter in a drilling operation. When openings are being drilled in lenses, the opening is first drilled from one side of the lens and the latter is reversed and the opening completed from the opposite side. In the reversal of the lens the projection 7 is utilized to enter the recess formed by the initially drilled opening, insuring the exact position of the lens in order that the opening may be properly drilled therein.

It is necessary in drilling openings in lenses, for attachment of the nose pieces thereto, for instance, that some convenient means be provided to hold the lens at a desired adjustment relative to the drill, whereby the opening drilled in said lens will be at a predetermined point with reference to the edge of the lens. In the present tool a small gage plate 8 is used to accomplish the above, said plate being formed with an upturned extremity 9 constituting a seat or bearing against which an end of the lens may be placed, in positioning the same with reference to the drill 5. The upturned extremity 9 is curved to conform with the edge contour of the lens, and the plate 8 is longitudinally slotted as shown at 10, to permit of slight adjustment thereof relative to the drill 5. A screw 11 is employed to hold the gage plate 8 in an adjusted position and passes through the slot 10, screwing into a threaded opening provided in the bed plate 1. By slightly loosening the screw 11 the gage plate 8 may be moved to adjust its extremity 9 with reference to the drill 5.

The form of the gage plate 8 is peculiar. It is provided at its outer end with an integrally upwardly projecting anvil member 12 the latter preventing casual displacement of the gage plate, and limiting the movement of the latter in one direction. The anvil 12 is provided as a convenient means for permitting of use of a punch in order to close the threaded opening formed in one of the ears comprising the stud-piece or pieces of a nose piece of eye glasses. By using the punch 13 as indicated in Fig. 2 the stud of the nose piece 14 may be readily operated upon, so as to swage the metal of one of the ears resting on the anvil 12, whereby to close the threaded opening in said ear and permit of use of a tool to retap said opening. Very frequently the threaded openings of the studs of nose pieces become stripped of their threads and it is necessary to rethread them. Under such conditions the operation of threading or retapping the ear of the stud will be performed in the manner above described using the punch 13 in said operation. The anvil 12 is formed with a slot 12$^a$ extending from the slot 10 of the plate 8, upwardly, and permitting the stud of the nose piece of a pair of eye glasses to be so arranged that the upper portion of the anvil or member comprising the same is received between the ears of said stud, making it easy to support the nose piece upon the anvil in operating upon this part in the manner hereinbefore set forth.

Under certain conditions it may be desirable that the gage plate 8 be removable or detachable from the bed plate 1, without necessitating removal of the adjusting screw 11. With this in view the modification of the invention shown in Fig. 4, may be employed, wherein the slot 12$^b$ of the member 12′ of the gage plate is transversely widened to permit the head of the screw 11 to pass therethrough when said gage plate is given a longitudinal or endwise movement. The lower end of the screw 11 in the modification could be readily upset so as to form a small head preventing the removal of the screw and likelihood of loss thereof.

The operation and advantages of the invention will be very clear from the foregoing and from the standpoint of practical use it will be observed that the tool above described is extremely desirable by reason of its portability and simplicity.

Having thus described the invention what is claimed as new is:—

An optical tool of the character described comprising a bed plate, an adjustable gage plate provided with a longitudinal slot mounted upon the bed plate, and a screw extending through said slot into the bed plate to secure the gage plate in adjusted position, the outer end of the gage plate being upturned to constitute an anvil and being slotted for the purpose set forth, the latter slot being an extension of the former slot.

In testimony whereof I affix my signature in presence of two witnesses.

GEORGE E. SCHOFIELD.

Witnesses:
BERNARD A. SCHMITZ,
FRANK M. MERRIKEN.